United States Patent Office 2,898,193
Patented Aug. 4, 1959

2,898,193

METHOD FOR MAKING TITANIUM NITRIDE

Helmut Espenschied, Metuchen, N.J., assignor to National Lead Company, New York, N.Y., a corporation of New Jersey No Drawing. Application September 16, 1952
Serial No. 309,943

3 Claims. (Cl. 23—191)

The present invention relates in general to refractory metal compounds and more particularly to titanium compounds of nitrogen and to an improved method for making the same.

Heretofore, refractory metal compounds of carbon, zirconium and the like, sometimes referred to hereinafter as metalloids, have been prepared with a modicum of success by heating dry mixtures of a refractory metal oxide such as, for example, calcined titanium dioxide or zirconium oxide and carbon to form the refractory metal carbide. However, prior methods have had to contend with the problem of obtaining intimate and permanent contact between the inherently coarse metal oxide particles and the carbon particles which, due to their fineness, tend to separate out from the mixture during fusion. In attempting to overcome this difficulty, prior technicians have resorted to pelletizing the mixtures and then heating the pellets at temperatures from 2000° C. to 2500° C. The resulting product is a hard sintered mass of material which must be subsequently broken up into smaller particles and ground. However, such products can be ground mechanically to form a finely divided powder only with great difficulty due to the abrasiveness and hardness of the compositions. Hence, even the ground material is relatively coarse, the smallest particle size being about 80 microns. Moreover, the purity and toughness of this product is often impaired by a high percentage of graphite which is formed from the carbon at the high sintering temperatures used. Although these relatively coarse products have been used in the field of powder metallurgy, the impurity and coarse granular nature of the material has impaired its usefulness. There is, therefore, no direct and commercially practicable method for producing finely divided relatively pure metalloids without recourse to grinding and milling operations.

An object, therefore, of the present invention is to provide an improved method for making a refractory metal compound of nitrogen which is economical, which may be carried out at relatively low temperatures and which is productive directly of a relatively pure finely divided product.

A further object of the invention is to provide a superior method for forming a mixture of carbon, a refractory metal and nitrogen wherein the carbon particles are maintained in intimate contact with the particles of refractory metal.

A still further object of the invention is to provide substantially pure finely divided titanium nitride composition.

These and other objects will become apparent from the following more complete description of the instant invention.

The term "finely divided" as used herein with reference to the size of the particles of titanium nitride formed directly by the process of this invention shall be understood to mean that the effective sizes of the particles may vary from 1 to 15 microns.

In its broadest aspects, the present invention relates to a new and improved titanium nitride composition; and to an improved method for making said composition which comprises forming an intimate mixture of a titanium hydrate and carbon, and then heating the mixture in an atmosphere of nitrogen at a temperature of from 1300° C. to 1500° C. to produce finely divided particles of titanium nitride.

In carrying out the invention it was discovered that the successful production of substantially pure finely divided titanium nitride composition is dependent, in large measure, upon achieving an intimate mixture of the carbon and titanium components. As pointed out above, due to the coarseness of calcined oxides of titanium, as compared to the particle size of lamp black, it is impossible to form and maintain an intimate mixture of calcined titanium dioxide and finely divided carbon. However, the instant invention embraces the discovery that the problem of forming intimate mixtures of titanium and carbon can be effectively solved by providing the titanium component in the form of a titanic acid hydrolysate, sometimes known as basic titanium sulfate or basic titanium chloride, and referred to hereinafter as titanium hydrate.

The titanium hydrate used in carrying out the process of this invention may be titanium metahydrate or titanium orthohydrate and is preferably an untreated hydrate which occurs as an intermediate product in the production of titanium dioxide pigment and which is generally referred to in the art as "pulp." This untreated titanium hydrate comprises primary particles, the effective sizes of which may be from .05 to .1 micron. Moreover, since the untreated pulp is usually formed by hydrolyzing an acid solution of titaniferous ore, the untreated pulp will contain or be combined with about 10% acid on the basis of the titanium dioxide content. The pulp may be formed from a sulfate solution and in such cases will contain about 10% sulfuric acid. However, a chloride solution may be used in which case hydrochloric acid will be present in the titanium hydrate.

In achieving the objects of this invention it has been discovered, quite unexpectedly, that an aqueous slurry comprising untreated titanium hydrate, water and finely divided carbon formed an intimate mixture of the hydrate and carbon particles; and that, when this mixture was calcined at relatively low temperatures, in the range of from 1300° C. to 1500° C. and in a nitrogen atmosphere, a substantially pure finely divided titanium nitride composition was formed.

While an exact explanation for the intimate coalescence of the particles of hydrate and carbon is not thoroughly understood, it is postulated that since the finely divided particles of hydrate are of substantially the same size as the carbon particles, the respective particles intermingle readily to form a substantially homogeneous mixture; and that this tendency is augmented by the presence of the 10% acid (sulfuric or hydrochloric) which forms an acid slurry and appears to act as a wetting agent for wetting the particles of carbon. This theory is supported by evidence indicating that a pulp from which the acid has been substantially removed, produces less satisfactory admixtures of the hydrate and carbon particles.

With respect to the carbon used in the mixture of materials, a finely divided carbon such as lamp black or oil burner soot is suitable, the unit particles of which have an effective size of from about .01 to .05 micron.

In carrying out the process of this invention for the preparation of titanium nitride, the titanium component in the form of titanium hydrate is mixed with water and with carbon in the form of lamp black or oil burner soot and wet milled to form a slurry. After thoroughly mixing the slurry by agitation or other suitable means, it may then be dried by heating to a suitable temperature to form a substantially dry cake.

Preferably, the dried or partially dried cake is then ground to provide a powdery material of substantially uniform particle size which is transferred directly to calcining-means such as, for example, an induction furnace or a rotating kiln capable of maintaining the temperatures required for calcining the powdered material. The material is calcined at temperatures of from about 1350° C. to about 1500° C. for from about 1 to 3 hours in an atmosphere of nitrogen.

Although the preliminary drying and calcining treatments of the slurry is described above as comprising two separate steps, it will be understood that the drying and calcining treatments may be accomplished in the calcining means as one operation.

The reaction between the hydrate and carbon during calcination in the presence of nitrogen may be represented by the following equation:

$$2TiO_2 + 4C + N_2 = 2TiN + 4CO$$

wherein 2 mols of titanium dioxide, added in the form of titanium hydrate containing about 10% sulfuric acid, reacts with 4 mols of carbon and 1 mol of nitrogen to form 2 mols of titanium nitride and 4 mols of carbon monoxide.

The final product is a metallic powder having substantially no free carbon, the percentage of titanium present being from 73% to 78% and the percentage of nitrogen present being from 18% to 21% which compares favorably with the theoretical composition of pure titanium nitride. The size of the titanium nitride particles formed directly by calcination of the hydrate and carbon in an atmosphere of nitrogen, that is to say, without subsequent grinding, varies from 1 to about 15 microns and may be smaller if somewhat higher calcining temperatures are used.

To further illustrate the invention, the following example is given:

*Example I*

To 134 parts by weight of titanium hydrate containing about 10% sulfuric acid were added 39 parts by weight of carbon in the form of lamp black, and the necessary amount of water to form a thick acid slurry. The slurry was then agitated for a sufficient length of time to insure an intimate mixture of the hydrate and carbon particles whereupon the slurry was dried by heating to a temperature of 200° C. for 6 hours. The resulting dried cake was ground to provide a powder of substantially uniform particle size which was then introduced into a resistance furnace and calcined at a temperature of about 1285° C. for 3 hours in an atmosphere of nitrogen.

The resulting product comprised a finely divided powder, the effective size of the primary particles being from 1 to 10 microns. An analysis of the product showed about 74% titaninm and 20% nitrogen.

In accordance with the improved process of this invention, metalloids of refractory metals and in particular titanium nitride may be produced in an efficient and economical manner, and from relatively inexpensive source materials. Moreover, the temperatures employed are relatively low, thereby precluding sintering and the formation of relatively large size particles. Further, the finely divided powder of this invention is the direct product of the calcination treatment, that is to say, requires no grinding operations and has an effective particle size ranging from 1 to 15 microns, the titanium nitride particles being substantially free of free carbon, occluded graphite or other foreign materials. The highly superior titanium nitride produced by the present invention is thus ideally suited for use in powder metallurgy, as an abrasive, and in the production of cutting tool alloys and high temperature resistant alloys.

I claim:

1. Method for the production of titanium nitride comprising slurrying a mixture of an uncalcined titanium hydrate pulp, as obtained by hydrolyzing an acid titanium salt solution, and finely divided carbon and heating said mixture at a temperature of from 1350° C. to 1500° C. in an atmosphere of nitrogen to produce titanium nitride of a particle size from about 1 micron to about 15 microns.

2. Method for the production of titanium nitride which comprises admixing uncalcined titanium hydrate pulp, as obtained by hydrolyzing an acid titanium salt solution, lamp black and water to form a slurry, agitating said slurry to form an intimate mixture of said hydrate and lamp black and then heating said mixture at a temperature of from 1350° C. to 1500° C. in an atmosphere of nitrogen to calcine said mixture and produce titanium nitride of a particle size from about 1 to about 15 microns.

3. Method for the production of titanium nitride which comprises slurrying a mixture of uncalcined titanium hydrate pulp, as obtained by hydrolyzing an acid titanium salt solution, finely divided carbon and a wetting agent selected from the group consisting of sulfuric acid and hydrochloric acid, heating said mixture at a temperature of from 1350° C. to 1500° C. in an atmosphere of nitrogen to calcine said mixture and produce titanium nitride of a particle size from about 1 micron to about 15 microns.

References Cited in the file of this patent

UNITED STATES PATENTS

| | | |
|---|---|---|
| 957,842 | Bosch | May 10, 1910 |
| 1,333,819 | Jebsen | Mar. 16, 1920 |
| 1,391,147 | Bichowsky et al. | Sept. 20, 1921 |
| 1,969,061 | Cauwenberg | Aug. 7, 1934 |
| 2,166,221 | Patterson | July 18, 1939 |

FOREIGN PATENTS

| | | |
|---|---|---|
| 12,471 | Great Britain | May 23, 1896 |
| 115,020 | Great Britain | Jan. 30, 1919 |
| 122,523 | Great Britain | Jan. 30, 1919 |

OTHER REFERENCES

Kingston: "The Physics of Powder Metallurgy," 1st ed., 1951, pages 295–302.

Barksdale: "Titanium," 1949, page 152.